Dec. 14, 1965    H. M. VALENTINE    3,223,458
BRAKE MECHANISM
Filed Dec. 31, 1962    4 Sheets-Sheet 2

INVENTORS
Harry M. Valentine
BY Scrivener and Parker
ATTORNEYS

Dec. 14, 1965 H. M. VALENTINE 3,223,458
BRAKE MECHANISM
Filed Dec. 31, 1962 4 Sheets-Sheet 3
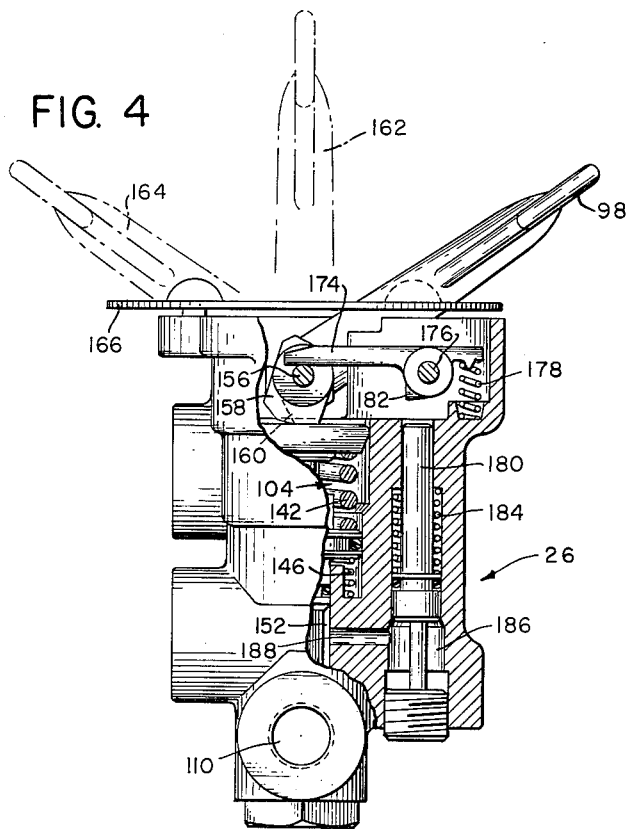
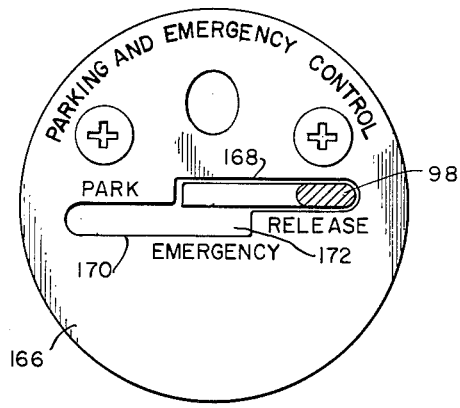
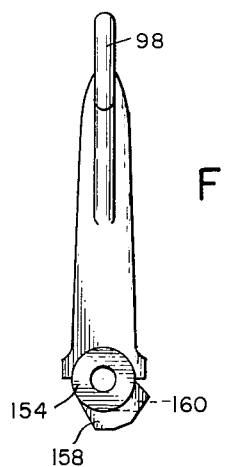
INVENTOR
Harry M. Valentine
BY *Scrivener and Parker*
ATTORNEY Dec. 14, 1965   H. M. VALENTINE   3,223,458
BRAKE MECHANISM
Filed Dec. 31, 1962   4 Sheets-Sheet 4
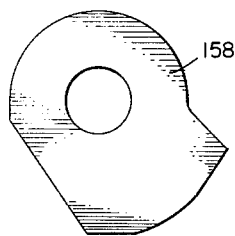
FIG. 8
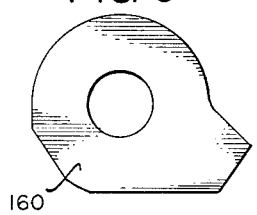
FIG. 9
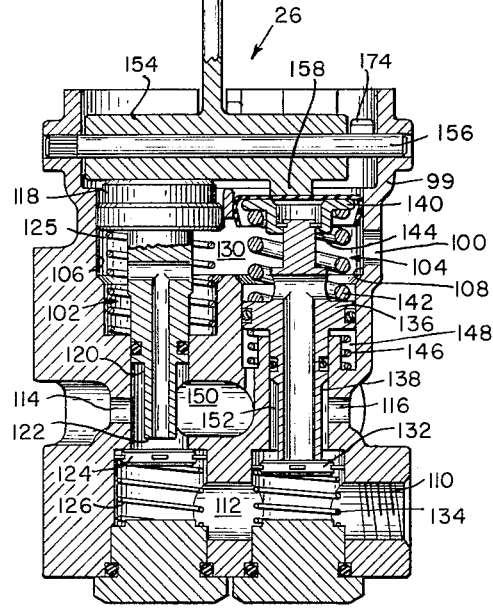
FIG. 5
| CONTROL SEQUENCE | | | |
|---|---|---|---|
|  | RELEASE | EMERGENCY | PARK |
| LOCK PORT | PRESSURIZED | VENTED | VENTED |
| EMERGENCY PORT | VENTED | PRESSURIZED | VENTED |
FIG. 10
INVENTOR
Harry M. Valentine
BY Scrivener and Parker
ATTORNEY

United States Patent Office 3,223,458
Patented Dec. 14, 1965

3,223,458
BRAKE MECHANISM
Harry M. Valentine, Elyria, Ohio, assignor to Bendix-Westinghouse Automotive Air Brake Company, Elyria, Ohio, a corporation of Delaware
Filed Dec. 31, 1962, Ser. No. 248,751
10 Claims. (Cl. 303—6)

This invention relates to a brake mechanism for vehicles and more particularly to a safety and parking brake mechanism for vehicles equipped with conventional air brake systems.

One of the principal objects of the present invention is to provide a novel compressed air safety and parking brake system for vehicles which is so constituted as to mechanically hold the brakes in applied position even though the system pressure drops below its normal safe value for vehicle operation.

Another object is to provide in a compressed air braking system, a novel arrangement whereby the brakes may be pneumatically applied and then locked in the applied position after release of compressed air from the brake actuators.

Still another object is to provide in a system of the above character, a novel arrangement wherein release of the brakes may not be effected until the system pressure rises to a predetermined value such that it would be safe for the vehicle to proceed.

A further object is to provide a system wherein the brakes may be applied and locked in applied position by a novel manually operated control, such an arrangement providing an efficient emergency and parking brake construction under the direct supervision of the operator.

A still further object resides in the provision of a novel fluid pressure interlock system which insures the completion of a certain sequence of events before permitting subsequent functions to be executed.

Another object of the invention is to provide a novel fluid emergency brake so constituted that in the event the system pressure drops below a predetermined minimum the safety brakes are automatically applied and locked in the applied position, notwithstanding any further drop in pressure.

Another object resides in the provision of a novel manually operable control valve for a system of the above type, which is so constituted as to provide a highly efficient control of the brake actuators and the brake locking construction, so that when the actuators are applied for parking the vehicle, the brakes are locked in applied position, thus enabling the brake actuators to be exhausted.

Other objects and novel features of the invention will appear more fully hereinafter from the following detailed description when taken in connection with the accompanying drawings. It is to be expressly understood, however, that the drawings are utilized for purposes of illustration only and are not to be taken as a definition of the limits of the invention, reference being had for this purpose to the appended claims.

Referring to the drawings wherein similar reference characters refer to similar parts throughout the several views:

FIG. 4 is an end view, partly in section, of the novel control valve;

FIG. 5 is a sectional side view of the control valve of FIG. 4;

FIG. 6 is a plan view of the cover plate and dial of the control valve;

FIG. 7 is an end view of the valve control handle and valve actuating cams;

FIGS. 8 and 9 are enlarged sectional views of the valve actuating cams, and

FIG. 10 is a chart showing the control sequence of operations in accordance with the movement of the valve control handle.

Figure 1:
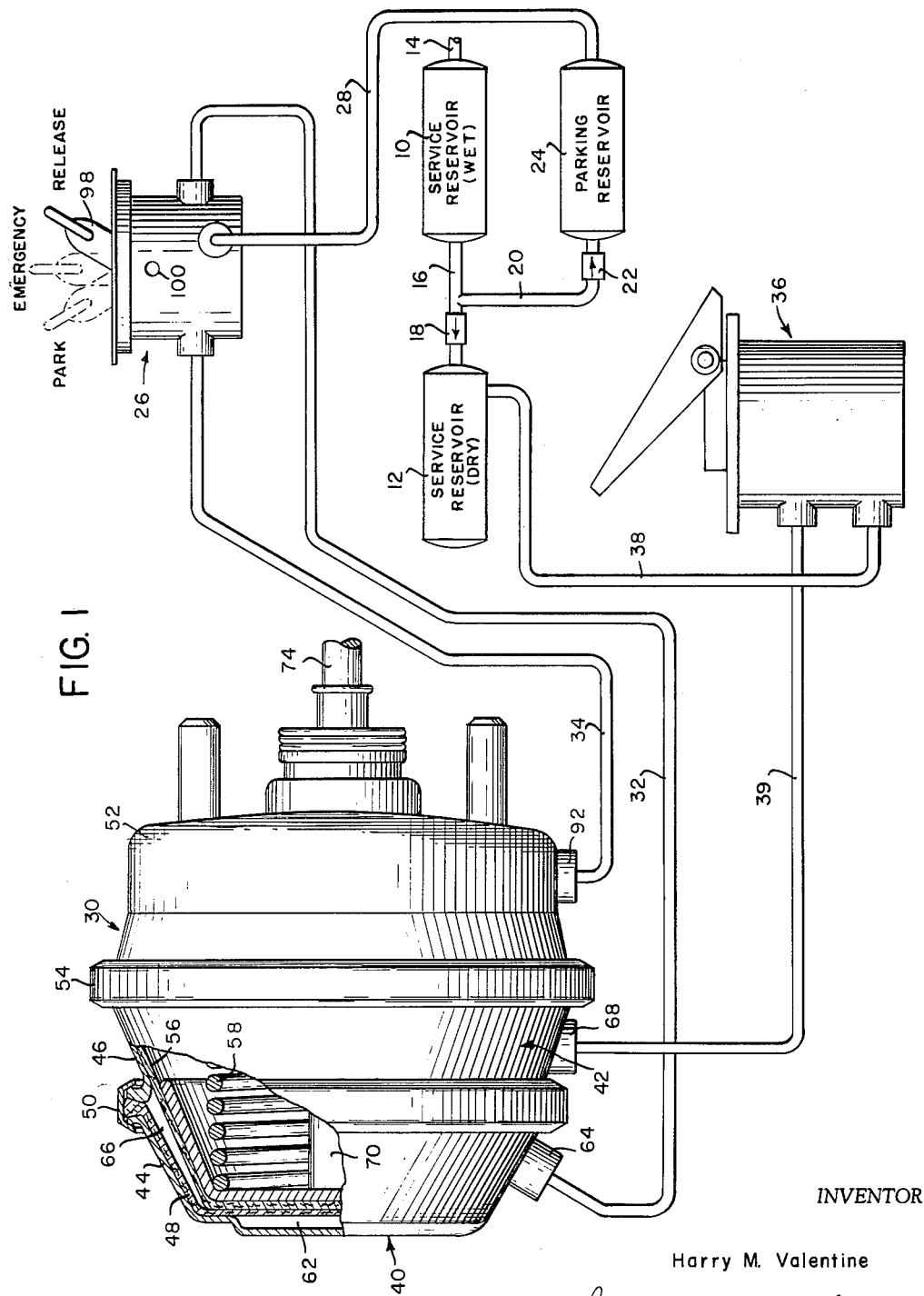
FIG. 1 is a diagrammatic view partly in section of a safety and parking brake system embodying the principles of the present invention.

Referring more particularly to FIG. 1, the novel safety and parking brake system of the present invention is illustrated therein as including a pair of service reservoirs 10 and 12 which are adapted to be supplied with compressed air from any suitable source by way of conduit 14. The reservoirs 10 and 12 are interconnected by a conduit 16 including a one-way check valve 18, and reservoir 10 is connected through conduit 20 and one-way check valve 22 with a parking reservoir 24, the latter thus being adapted to serve as a protected source of compressed air which is connected with a novel control valve 26 by way of a conduit 28. By means to be described more fully hereinafter, the control valve 26 is adapted to control the fluid pressure energization of a combined emergency and service brake actuator 30 by way of conduits 32 and 34, the construction being such that a brake application may be mechanically locked or released under certain conditions of operation of the system. A brake valve 36, of conventional construction, may be supplied with fluid pressure from the service reservoir 12, by way of conduit 38, and controls the service brake portion of the actuator 42 through a conduit 39.

Figure 2:
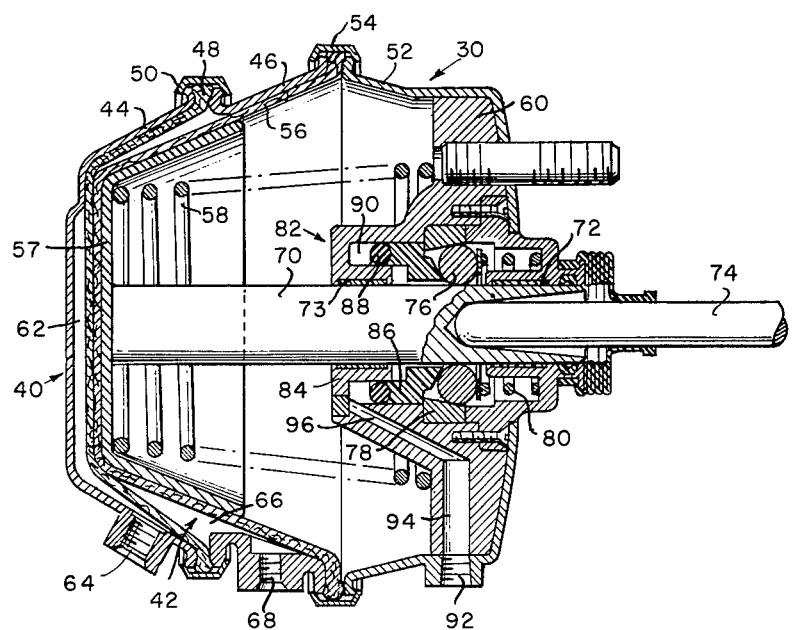
FIG. 2 is an axial sectional view of the brake actuator which is preferably used in the system of FIG. 1.
Figure 3:
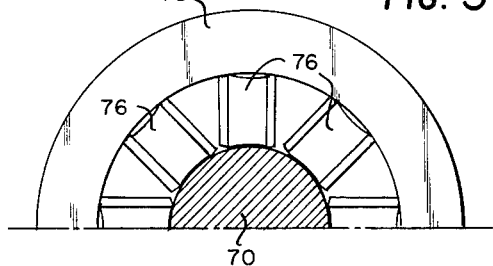
FIG. 3 is an enlarged transverse sectional view of a portion of the actuator of FIG. 2 illustrating the relationship of the brake locking rollers and the brake push rod.

Referring more particularly to FIG. 2, the actuator 30 includes an emergency portion 40 and a service portion 42, the former including casing parts 44 and 46 having the peripheral portion of an emergency diaphragm 48 clamped therebetween by a suitable clamp 50. Part 46 is connected with casing part 52 by a clamp 54 with the peripheral portion of a service diaphragm 56 therebetween, a suitable push plate 57 bearing against the diaphragm 56 through the action of a return spring 58 having its opposite end bearing against the end wall 60 of the actuator. It will be seen from FIGS. 1 and 2 that the emergency portion 40 includes an emergency chamber 62 which is connected with the conduit 32 by way of an emergency port 64 while the service portion 42 includes a service chamber 66 which is connected with the conduit 39 by way of a service port 68. In order to make the actuator 30 as short as possible, the casing parts 44 and 46 are tapered and the diaphragm 48 and 56 are arranged in nesting relationship with the service diaphragm 56 of a larger effective area. As shown, a push rod 70 is secured to the push plate 57 and is slidable through guides 72 and 73 carried by the end wall 60, the push rod being provided with a recess for receiving the end of a brake applying rod 74. As well understood by those skilled in the art, the opposite end of the brake rod 74 may be connected with the vehicle brake through a conventional slack adjuster or other type of brake arm.

With the above arrangement it will be understood that when fluid pressure is supplied to the emergency chamber 62, both diaphragms 48 and 56 will be moved to the right to effect a brake application through corresponding movement of the push rod 70 and brake rod 74.

The present invention provides an arrangement for mechanically and automatically locking the actuator 30 in brake applied position and as shown includes a brake lock comprising a plurality of locking rollers 76 which are interposed between a cam ring 78 and the push rod 70 and are normally urged into locking position by means of a spring 80. In this position, brake applying movement of the rod 70 to the right may take place. However, any movement of the rod 70 to the left, corresponding to brake releasing movement, is prevented since the locking rollers become firmly wedged between the ring 78 and the rod 70 through the action of a spring 80. Thus, after the brake has been applied, the locking rollers 76 prevent brake releasing movement of the rod 70.

Means are provided for maintaining the locking rollers 76 in released position and preferably such means is controlled by fluid pressure. As shown, a fluid pressure release means 82 includes a cylinder 84 in which a deformable annular piston 86 of suitable plastic material is housed and positioned between an O-ring seal 88 and the rollers 76, the cylinder including a lock releaser chamber 90 to which fluid pressure from conduit 34 may be conducted by way of lock port 92 and ducts 94 and 96 formed in the end wall 60. Thus, when the chamber 90 is charged with fluid under pressure of a predetermined magnitude, piston 86 is effective to move the locking rollers 76 to the right against the tension of the spring 80 to relieve the locking effect of the rollers upon the push rod 70 and allow movement of the latter in opposite directions for brake application and release. On the other hand when the chamber 90 is exhausted, the spring 80 is effective to move the rollers 86 into locking position and prevent any left hand movement of the push rod 70 as above described.

Referring to FIG. 1, the novel control valve 26 includes a manually operable handle 98 which is movable to three different positions as shown. When the handle occupies the Release position, fluid pressure is conducted to the lock port 92 and the release chamber 90 of the actuator 30 by way of conduit 34 in order to maintain the locking rollers 76 in released position. At the same time, the emergency chamber 62 is vented to atmosphere by way of conduit 32, valve 26 and exhaust port 100, in a manner to be described more fully hereinafter. Thus, the brake and the brake lock are both in the released position.

When the handle 98 is moved to the Emergency position, the emergency port 64 and emergency chamber 62 are pressurized, while the lock release chamber 90 is vented to atmosphere by way of the conduit 34 and the exhaust port 100. In such case, the brake is applied and since the locking rollers 76 are effective to lock the brake rod 70, the brake will remain in applied position even though the pressure at the source 24 may decrease to such a value that operation of the vehicle would be unsafe.

Movement of the handle 98 to the Park position has no effect on the lock release chamber 90 and thus the locking rollers remain in locked condition. However, the emergency chamber 62 is vented to atmosphere in order to relieve the pressure acting upon the emergency diaphragm 48. Thus, in this position, the brake is mechanically locked in the applied position. The control sequence just described is also set forth in the chart of FIG. 10.

The novel control valve 26 is more particularly shown in FIGS. 4 and 5 and includes a casing 99 having a lock control valve 102 and an emergency control valve 104 mounted therein in spaced apart parallel bores 106 and 108 respectively. The lock control valve 102 is adapted to control the flow of fluid pressure to and from the lock control port 92 by way of inlet port 110, inlet chamber 112 and outlet port 114, the inlet chamber 112 being common to both valves as shown. Emergency control valve 104 on the other hand, is adapted to control the flow of fluid pressure to and from the emergency port 64 by way of the inlet port 110, inlet chamber 112 and outlet port 116.

The lock control valve 102 is a manually operable open and shut type of valve including a plunger 118 having a hollow stem 120, the latter being provided with an end portion 122 adapted to cooperate with a disk type combined inlet and exhaust valve element 124. The plunger 118 is constantly urged toward its upper position, as shown in FIG. 5, as by means of a spring 125. Valve element 124 is constantly urged toward its closed position by a spring 126, and in this position of the valve element, communication between the inlet chamber 112 and the outlet port 114 is interrupted and the latter port is connected to the exhaust port 100 by way of the hollow plunger 120 and exhaust chamber 130. On the other hand, when the lock control valve 102 is moved downwardly to bring the end 122 into engagement with the valve element 124, communication between the outlet port 114 and exhaust port 100 is interrupted, and upon opening of the valve element 124, communication is established between the inlet chamber 112 and the outlet port 114.

The emergency control valve 104 is constructed in a novel manner and is such that it may be manually and pneumatically operated. As shown, the emergency control valve includes a disk type of valve element 132 which functions as a combined inlet and exhaust valve and is normally urged toward its closed position as by means of a spring 134. The movements of the valve element 132 are controlled by an emergency plunger or piston 136 having a hollow stem 138 communicating at all times with the exhaust chamber 130. An actuating cup 140 is slideably mounted on the upper end of the plunger 136 and a preloaded spring 142 is interposed between the cup 140 and the plunger 136, the upward movement of the cup 140 with respect to the plunger 136, being limited by a stop washer 144. A spring 146 normally tends to urge the plunger 136 in an upward direction. As shown, plunger 136 is slideably mounted within a control chamber 148 which is in constant communication with the outlet port 114 and outlet chamber 150 of the lock control valve 102. In the position shown in FIG. 5, the inlet port 110 and inlet chamber 112 communicate with the outlet opening 116 past the open valve 132, the chamber 112 and the port 116 communicating with each other by way of an outlet chamber 152 of the emergency control valve.

Novel means are provided for sequentially controlling the operation of the valves 102 and 104 in such a manner as to secure the novel sequence of operation of the emergency chamber 62 and the lock release chamber 90 as heretofore described. More particularly, such means include the control lever 98 which is provided with a sleeve 154 rotatably mounted on a pin 156, the latter being suitably mounted in the housing 99 as shown in FIG. 5. Sleeve 154 is provided with an emergency cam 158 for controlling the emergency control valve 104 and is also provided with a lock control cam 160 for controlling the operation of the lock control valve 102, these cams being more particularly shown in FIGS. 4, 7, 8 and 9. Referring to FIG. 4, showing the release position of the handle 98, the cams 158 and 160 are effective to maintain the valves 102 and 104 in such position that the valve elements 124 and 132 are moved to open position. When handle 98 is moved to the vertical Emergency position shown at 162 of FIG. 4, the emergency cam 158 maintains the emergency valve 104 in the open position. However, the lock control cam 160 is moved to the position shown in FIGS. 5, 7 and 9 so that the lock control valve 102 is moved to the exhaust position shown in FIG. 5. When the handle 98 is moved to the Park position shown at 164, FIG. 4, both cams 158 and 160 are moved out of contact with respect to the valves 102 and 104 so that both of the latter are moved to exhaust position.

It will be recalled from the previous description of the operation of the valve mechanism 26 by the handle 98, that when the handle is moved to the Emergency position, the lock port is vented and the emergency port is pressurized and that when the handle is moved to the Park position, the emergency port is vented. In such case, the lock mechanism is effective in both the Emergency and Park positions. However, the handle should remain in the Emergency position for a sufficient length of time to enable sufficient build-up of pressure in the emergency diaphragm 62 so as to secure an effective brake application before the fluid pressure from the chamber 62 is exhausted when the handle 98 is moved to the Park position. A novel arrangement is provided in the control valve 26 for securing this desirable result and in the form shown, includes a time delay mechanism which insures a proper brake application prior to exhausting of the fluid pressure from the emergency chamber 62 when the lever 98 is finally moved to the Park position.

Referring to FIG. 6, the oscillating movement of the handle 98 on the pin 156 is controlled by a cover plate 166 which is suitably secured to the casing 100 and is provided with a pair of slots 168 and 170 which are interconnected by a cross slot 172. Thus lever 98 and sleeve 154 may be oscillated in the slot 168 between Release and Emergency positions and may be oscillated in the slot 170 between Emergency and Park positions. Sleeve 154 is mounted on the pin 156 so as to be capable of sliding movement on the pin so that the handle 98 may be moved laterally within the cross slot 172 so as to be capable of oscillation in the slot 170 from the Emergency to the Park positions. In order to insure the effective brake application in the emergency position, a pneumatically controlled stop lever 174 cooperates with the sleeve 154 and in the positions shown in FIGS. 4 and 5, such stop lever prevents movement of the handle 98 in the cross slot 172. Stop lever 174 is pivotally mounted upon a pin 176 and is normally urged toward the stop position of FIG. 4 as by means of a spring 178. Stop lever 174 is arranged to be moved out of its stop position with respect to the sleeve 154 as by means of a pneumatically operable stop plunger 180, see FIG. 4, which when moved upwardly, engages a cam 182 of the stop lever 174 to move the latter in a clockwise direction about the pin 176. When this occurs, the sleeve 154 may be moved to the right as seen in FIG. 5 and hence the handle 98 is moved in the cross slot 172 so as to be capable of movement to the Park position in slot 170. Stop plunger 180 is normally urged to the position shown in FIG. 4 by a spring 184. A chamber 186 beneath the stop plunger 180 is in constant communication with the outlet chamber 152 of the emergency control valve 104 by way of bore 188 and due to this construction, the stop plunger 180 is moved upwardly to move the stop lever 174 to its inoperative position whenever the fluid pressure within the outlet chamber 152 rises to a value sufficient to overcome the effect of the spring 184.

In operation, and assuming that there is no fluid pressure in the system, it will be understood that the emergency chamber 62 and the lock release chamber 90 are both vented so that the brake is released and the locking rollers or brake lock 76 is in operation. As the system air pressure builds up, the reservoirs 10, 12 and 24 will be brought up to full pressure. Since the control handle 98 of the control valve 26 is in the Release position shown in FIG. 4, the cams 158 and 160 will maintain the emergency control valve 104 and the lock control valve 102 in the open position wherein the respective valve elements 132 and 124 are open and communication is established between the parking reservoir 24 and the inlet chamber 112 by way of conduit 28 and inlet port 110. Under these conditions, reservoir pressure is gradually built up in the outlet chamber 150, the control chamber 148, the outlet chamber 152 and the chamber 186. When the system pressure reaches approximately 70 p.s.i., the stop plunger 180 is moved upwardly against the tension of the spring 184 to engage the cam 182 and move the stop lever to its inoperative position. As the system pressure increases to approximately 80 p.s.i., the pressure within the control chamber 148 is effective to move the plunger 136 upwardly against the tension of the preloaded spring 142 to permit the valve element 132 to move upwardly to its lapped position. Further increase of system pressure causes the plunger 136 to be moved upwardly in order to move the lower end of the plunger 138 out of contact with respect to the valve element 132 to connect the chamber 152 with the exhaust chamber 130 through the hollow plunger 138. Under these conditions, the emergency diaphragm chamber 62 is vented to atmosphere and since the chamber 186 is connected with chamber 152, chamber 186 will likewise be vented to atmosphere allowing the stop plunger 180 to be returned to the position of FIG. 4 and thus permit return of the stop lever to the position illustrated. The lock control valve 102 remains in its open position due to the positive action of the cam 160 so that full reservoir pressure may be conducted from the parking reservoir 24 to the lock port 92 by way of conduit 28, inlet port 110, inlet chamber 112, outlet chamber 150, outlet port 114 and conduit 34. Hence, in the Release position of the handle 98, the emergency port 64 is vented and the lock port 92 is pressurized as illustrated in the chart of FIG. 10.

If it is now desired to effect an application of the brake, the control handle 98 is moved in the slot 168 of FIG. 6 to the Emergency position 162 and the valve parts will assume the positions shown in FIG. 5. Thus, the cam 160 is moved to its inoperative position to allow the lock control valve 102 to be moved to the exhaust position where the lock release port 92 is vented through the valve 26 by way of the port 114, the hollow plunger 120 and the exhaust chamber 130. It should be borne in mind that when the control handle 98 is first shifted to the Emergency position, the emergency control plunger 136 occupied its exhaust position due to the pressure within the control chamber 148. As the pressure within such control chamber is gradually reduced, when the lock control valve 102 is moved to its exhaust position, the emergency piston 136 gradually moves downwardly under the control of the preloaded spring 142 so that the valve element 132 is moved to its open position to connect the inlet chamber 112 with the outlet chamber 152 and with the chamber 186 beneath the stop plunger 180. Hence, the emergency port 64 is simultaneously pressurized with the chamber 186 when the valve element 132 is opened. Under these conditions, the lock port is vented in order to enable locking operation of the locking rollers or lock 76 and the emergency chamber 62 is being charged with fluid pressure to apply the brake. However, the handle 98 is prevented from movement within the cross slot 172 of FIG. 6 due to the stop action of the stop lever 174. When the pressure within the chamber 186 builds up to approximately 70 p.s.i., the stop plunger 180 moves upwardly to move the stop lever 174 to its inoperative position in order to allow movement of the control handle 98 in the cross slot 172 for subsequent movement of the handle to the Park position within the slot 170. However, the time delay action of the stop plunger 180 is such as to insure sufficient pressurization of the emergency chamber 62 as to effectively apply the brake prior to movement of the stop lever to its inoperative position.

Shifting of the control handle 98 into the Park position may then be effected and since, under these conditions, the cam 158 is moved to its inoperative position, the emergency control valve 104 will be moved to its exhaust position wherein the emergency chamber 62 as well as the chamber 186 are connected to the exhaust chamber 130 of the valve 26. Under these conditions the lock port 92 and the emergency port 64 are both vented, the brake is applied and the brake lock 76 is effective to mechanically lock the brake in its applied position.

When the control handle 98 is moved from the Park to the Emergency position, the cam 158 mechanically moves the emergency control valve 104 to its open position in order to pressurize the emergency port 64 by way of the parking reservoir 24, conduit 28, inlet chamber 112, outlet chamber 152 and conduit 32. Thus, the emergency diaphragm 62 is pressurized in order to further apply the brake with a force slightly greater than the brake was initially applied, in order to loosen the locking effect of the rollers 76. This is due to the fact that the pressure in the parking reservoir has in the meantime reached the maximum pressure of approximately 100 p.s.i. The control handle 98 is thereupon moved within the cross slot 172 and back to its Release position within the slot 168. When this occurs, the lock control valve 102 is moved to its open position by the cam 160 in order to pressurize the lock port 92 and lock releasing chamber 90 by way of the inlet chamber 112, outlet chamber 150, outlet port 114 and conduit 34. It is here pointed out that in order to effectively release the brake application and the brake lock, the latter should be released prior to venting of the emergency chamber 62. Hence, the parts are so arranged that approximately 60 p.s.i. is required to release the brake lock 76. As this pressure builds up within the outlet chamber 150, it also builds up within the control chamber 148. However, the preloaded spring 142 is so designed, as heretofore pointed out, that approximately 80 p.s.i. is required within the control chamber 148 in order to move the emergency control valve 104 to the exhaust position. Thus, the construction of the valve 26 assures that the brake lock 76 will be released prior to the final venting of the emergency chamber 62 when the control handle 98 is returned to the Release position.

From the foregoing, it will also be understood that with the control handle 98 in the Release position, the construction of the valve 26 is such that the brake will be automatically applied and locked in the applied position when the system pressure drops below a predetermined value. For example, and with the control handle 98 in Release position, the emergency port 64 is vented and the lock port 92 is pressurized due to the movement of the emergency control valve 104 to its venting position and the movement of the lock control valve to the open position. However, with a drop in system pressure to approximately 70 p.s.i. in the control cavity 148 of the valve 104, the emergency plunger 136 will move downwardly, as viewed in FIG. 5, to open the valve element 132 and thus charge the emergency port 64. A further drop in system pressure to approximately 60 p.s.i. will cause application of the brake locking rollers 76. Thus the emergency brake chamber 62 will be charged to approximately 60 p.s.i. and the resultant brake application will be locked in the applied position, notwithstanding any further drop in system pressure.

A service brake application may be made at any time upon operation of the brake valve 36 which conducts compressed air from service reservoir 12 to the service chamber 42 by way of conduits 38 and 39.

The present invention thus provides a novel safety and parking brake arrangement wherein the brake may be applied for parking and may be mechanically locked in applied position after release of compressed air from the brake actuator. Such an arrangement conserves compressed air in the brake system of the vehicle and also assures that the parking brake is mechanically set before the driver leaves the vehicle. The novel control valve is moreover arranged in such a manner as to provide an efficient sequence of control of the energization of the parking brake as well as the brake locking mechanism. The construction is moreover of such a nature that effective brake application is insured and the brake locked in applied position prior to venting of the brake actuator. Again, the construction is such that release of the brake lock is assured prior to venting of the brake actuator in order to avoid any locking of the brake in applied position when the control handle of the control valve is returned to its Release position.

While one form of the invention has been shown and described herein with considerable particularity, various modifications may be resorted to without departing from the spirit of the invention. Reference will therefore be had to the appended claims for a definition of the limits of the invention.

What is claimed is:

1. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a manually operable member movable to a first position to connect said source with said release means and to connect said actuator with the atmosphere, and movable to a second position to connect said release means with the atmosphere and connect said actuator with the source, said manually operable member being movable from said second position to a third position to connect both said release means and said actuator with the atmosphere, means normally operative for preventing movement of said manually operable member from said second position to said third position, and means responsive to a predetermined pressure admitted to said actuator for moving said preventing means to an inoperative position.

2. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a first valve for controlling the application of fluid pressure to and from said release means, a second valve for controlling the flow of fluid pressure to and from said actuator, and a single manually operable member for controlling the operation of said first and second valves, said member being movable to a first position to operate said valves to connect the source with the release means and to connect the actuator with the atmosphere, and movable to a second position to operate said valves to connect the release means with the atmosphere and connect the actuator with the source, said manually operable member being movable from said second position to a third position to operate said valves to connect both said release means and said actuator with the atmosphere, and means controlled by fluid pressure admitted to said actuator for preventing movement of said manually operable member from said second position to said third position until the fluid pressure admitted to said actuator has reached a predetermined value.

3. A brake system according to claim 2 wherein the last named means includes a stop device for normally preventing movement of said manually operable member from said second to said third position, and means responsive to a predetermined pressure admitted to said actuator for moving said stop device to an inoperative position.

4. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a first valve for controlling the application of fluid pressure to and from said release means, a second valve for controlling the flow of fluid pressure to and from said actuator, a first movable cam for operating said first valve, a second movable cam for operating said second valve, a single manually operable member for simultaneously controlling the movements of said first and second cams, and fluid pressure operated means responsive to the fluid pressure in said release means as controlled by said first valve, for controlling the operation of said second valve.

5. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a first valve for controlling the application of fluid pressure to and from said release means, a second valve for controlling the flow of fluid pressure to and from said actuator, a first movable cam for operating said first valve, a second movable cam for operating said second valve, a single manually operable member for simultaneously controlling the movements of said first and second cams, said member and cams being movable to a first position to move said first valve to open position to conduct fluid pressure to said release means and to move said second valve to open position to conduct fluid pressure to said actuator, and fluid pressure operated means responsive to a predetermined pressure conducted to said release means by said first valve for moving the second valve to release the fluid pressure from said actuator.

6. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a first valve movable between open and exhaust positions for controlling the application of fluid pressure to and from said release means, means including a first movable cam for moving said first valve to said positions, a second valve movable between open and exhaust positions for controlling the application of fluid pressure to and from said actuator, means including a second movable cam for moving said second valve to said open and exhaust positions, a single manually operable member for simultaneously controlling the movements of said first and second cams, and means responsive to the fluid pressure controlled by the movements of said first valve for moving said second valve independently of said second movable cam.

7. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a first valve for controlling the application of fluid pressure to and from said release means, a second valve for controlling the flow of fluid pressure to and from said actuator, and a single manually operable member for controlling the operation of said first and second valves, said member being movable to a first position to operate said valves to connect the source with the release means and to connect the actuator with the atmosphere, and movable to a second position to operate said valves to connect the release means with the atmosphere and connect the actuator with the source, means for guiding the movements of said member in a straight path between said first and second positions, said manually operable member being movable to a third position to operate said valves to connect both said release means and said actuator with the atmosphere, means for guiding the movement of said member to said third position in a second path displaced from said first named path, and means for preventing movement of said manually operable member from said first named path to said second path until the fluid pressure admitted to said actuator has reached a predetermined value.

8. A brake system according to claim 7 wherein the last named means includes a stop device for normally preventing movement of said manually operable member from the first named path to said second named path, and means responsive to a predetermined pressure admitted to said actuator for moving said stop device to an inoperative position.

9. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a first valve for controlling the application of fluid pressure to and from said release means, a second valve for controlling the flow of fluid pressure to and from said actuator, and a single manually operable member for controlling the operation of said first and second valves, said valve means also including a pressure operated member responsive to a decrease in fluid pressure from said source to a predetermined value for supplying fluid pressure to said actuator to apply the brake.

10. A fluid pressure safety brake system having a source of fluid pressure, a fluid pressure actuator for applying a vehicle brake, spring-applied brake locking means for locking said actuator in a brake applied position, fluid pressure operated release means for releasing said brake locking means, and valve means for controlling the application of fluid pressure to and from said actuator and to and from said release means, said valve means including a manually operable member movable to a first position to connect said source with said release means and to connect said actuator with the atmosphere, and movable to a second position to connect said release means with the atmosphere and connect said actuator with the source, said manually operable member being movable to a third position to connect both said release means and said actuator with the atmosphere, said valve means also including a pressure operated member responsive to a decrease in fluid pressure from said source to a predetermined value for supplying fluid pressure to said actuator to apply the brake.

References Cited by the Examiner

UNITED STATES PATENTS

| 1,484,475 | 2/1924 | Crown | 303—89 |
| 1,999,964 | 4/1935 | Gustafson | 303—50 |
| 2,108,182 | 2/1938 | Searle | 303—89 |
| 3,037,819 | 6/1962 | Sukala | 303—89 |
| 3,059,975 | 10/1962 | Morse | 303—29 |

EUGENE G. BOTZ, *Primary Examiner.*